United States Patent
Zimmermann et al.

(10) Patent No.: US 6,438,432 B1
(45) Date of Patent: Aug. 20, 2002

(54) PROCESS FOR THE PROTECTION OF STORED PROGRAM CONTROLS FROM OVERWRITING

(75) Inventors: Juergen Zimmermann, Vaihingen; Martin Wagener, Braunschweig, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,108

(22) PCT Filed: Jul. 16, 1997

(86) PCT No.: PCT/DE97/01495

§ 371 (c)(1),
(2), (4) Date: May 5, 1999

(87) PCT Pub. No.: WO98/08147

PCT Pub. Date: Feb. 26, 1998

(30) Foreign Application Priority Data

Aug. 24, 1996 (DE) .......................................... 196 34 341

(51) Int. Cl.⁷ .............................................. G05B 19/42
(52) U.S. Cl. .............................. 700/86; 700/87; 700/88; 700/21; 700/23; 711/163; 711/167; 711/173; 713/167; 713/200; 713/201; 380/240; 380/241; 380/242; 703/26; 703/27; 340/5.74; 340/5.8
(58) Field of Search ...................... 700/86, 87, 88, 700/21, 23, 28–32; 711/163–166, 167–173; 713/167; 380/200–201, 240, 242; 703/26–27; 340/5.74, 5.8

(56) References Cited

U.S. PATENT DOCUMENTS

| | | | | |
|---|---|---|---|---|
| 4,494,114 A | * | 1/1985 | Kaish | 340/825.31 |
| 4,667,176 A | * | 5/1987 | Matsuda | 340/52 F |
| 4,897,630 A | * | 1/1990 | Nykerk | 340/426 |
| 5,107,427 A | * | 4/1992 | Peter et al. | 700/78 |
| 5,146,215 A | * | 9/1992 | Drori | 340/825.32 |
| 5,451,822 A | * | 9/1995 | Bechtel et al. | 307/9.1 |
| 5,646,938 A | * | 7/1997 | Wagener | 370/276 |
| 5,694,011 A | * | 12/1997 | Corey et al. | 318/444 |
| 5,724,951 A | * | 3/1998 | Mukumoto | 123/687 |
| 5,844,517 A | * | 12/1998 | Lambropoulos | 314/176 |
| RE36,181 E | * | 4/1999 | Koopman, Jr. et al. | 380/23 |
| 5,970,251 A | * | 10/1999 | Zimmermann et al. | 700/86 |
| 6,243,837 B1 | * | 6/2001 | Zimmermann et al. | 714/51 |

FOREIGN PATENT DOCUMENTS

| | | |
|---|---|---|
| DE | 43 44 866 | 7/1995 |
| EP | 0 169 913 | 2/1986 |
| EP | 0 455 174 | 11/1991 |
| EP | 0 587 936 | 3/1994 |

\* cited by examiner

*Primary Examiner*—Ramesh Patel
(74) *Attorney, Agent, or Firm*—Kenyon & Kenyon

(57) ABSTRACT

A method is provided for protecting stored-program control systems, in particular in motor vehicles, which offers a software protection system for programming. A programming routine for programming by an external device is subdivided into segments in such a way that queries for programming authorization can be accomplished between the individual segments.

8 Claims, 1 Drawing Sheet

PROCESS FOR THE PROTECTION OF STORED PROGRAM CONTROLS FROM OVERWRITING

FIELD OF THE INVENTION

The present invention relates to a method for protecting stored-program control systems from being overwritten.

BACKGROUND INFORMATION

Methods for protecting stored-program control systems, which are preferably used in motor vehicles, are already known. In German Patent No. 43 44 866 a control device, in particular a motor vehicle control device, is programmed via an external programming device. In order to prevent unintentional programming, an inquiry must be made by the control device to the external programming device. The inquiry is accomplished via a means which can detect a signal to authorize programming if the external programming device is connected with its serial transmission line to the control device. After this security inquiry, programming of the control device is accomplished into a programmable nonvolatile memory of the control device, via the serial interface. This conventional method represents a purely hardware-based programming protection system. The purely hardware based protection system for the programmable memory requires the use of various electronic components in the control device, which are capable of detecting connection of the data transmission line on a hardware basis. This implies additional physical complexity for the control device.

Also, simple software security systems, which generally invoked by the programming device or tester, are conventional. With purely software-based security systems, there is always the risk that a skip in the program routine will cause authorization for programming to be granted incorrectly.

SUMMARY OF THE INVENTION

The method according to the present invention has the advantage that unintentional programming of the program memory cannot occur, since the programming routine contains additional security inquiries which check for authorization before execution of each programming segment. It is particularly advantageous if the programming routines that are stored in the control device are structured in the form of modules. As a result, unintentional deletion and writing of new data into the programmable memory is no longer possible, since the program cannot be activated even by an unintentional jump to an arbitrary position.

It is also advantageous to assemble the program routine from instruction sequences. When the instruction sequence is executed, authorization is also checked after each instruction.

It is advantageous in this context to store authorization flags in a RAM (random access memory). Advantageously, the authorization is performed not simply by storing once, but by repeatedly storing the authorization flag in the RAM in redundant fashion, and further programming can be accomplished only after checking multiple authorization flags.

A further advantageous embodiment is represented by storage of the authorization in the form of specific RAM address contents, whereby the program routine checks the contents of the addresses. It is also possible to generate the authorization as a combination of registers and data transferred from the programming device.

It is further advantageous, for authorization of the programming routine, for signals to be sent by the external programming device, which causes flags to be set in the programming routine.

This authorization can be implemented by the external programming device as a one-time transfer of the authorization signals, so that the authorizations are accessed in memory during programming.

Also advantageous, however, is a variant which queries the authorization from the programming device between the

DETAILED DESCRIPTION

Figure 1:
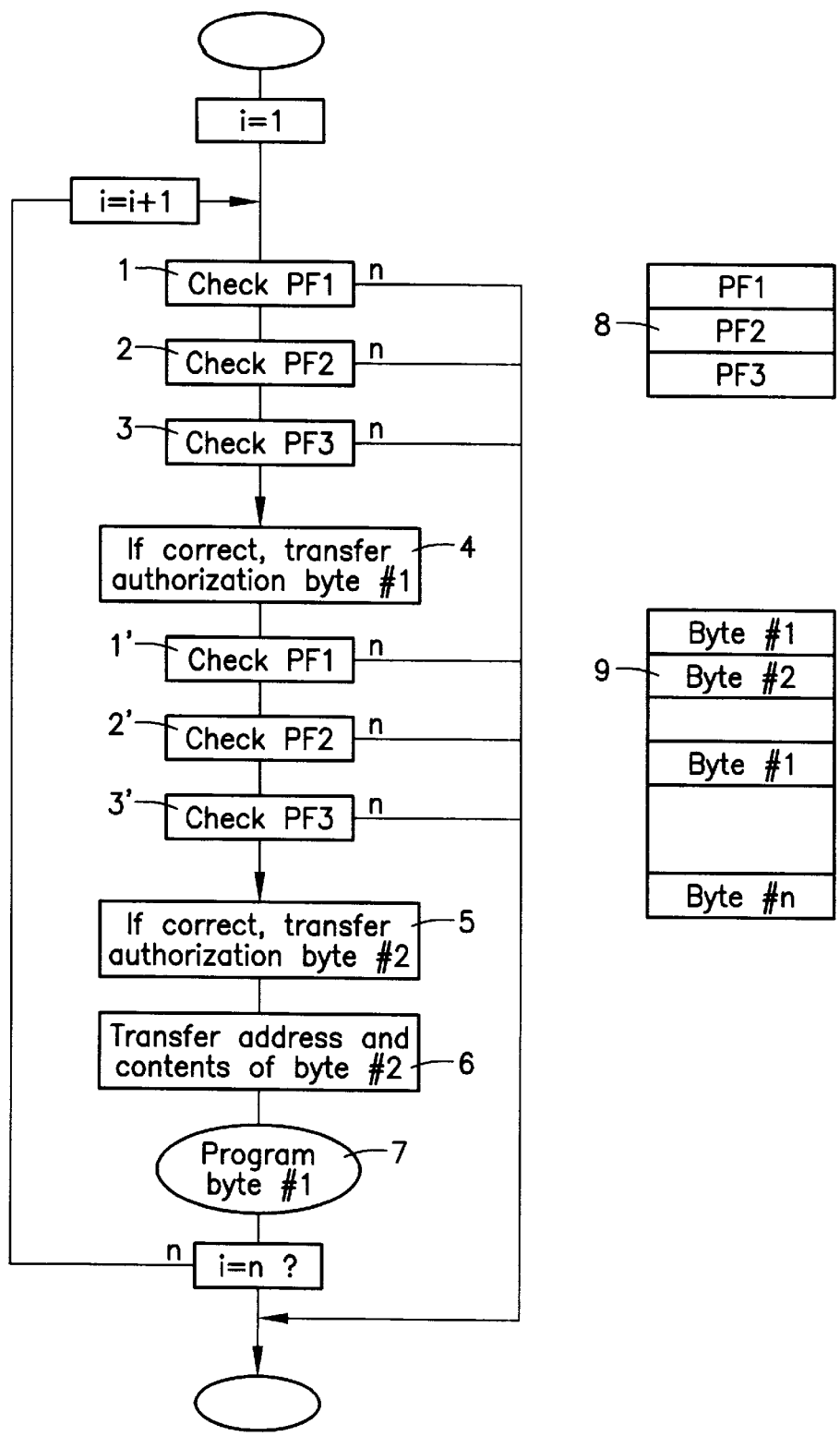
FIG. 1 illustrates a programming operation of a method according to the present invention.

A control device which is protected by a software protection system, in a manner defined by the method according to the present invention, from overwriting its program memory can be a braking, engine, or transmission control device. Usually, a control device of this kind can be connected via a diagnostic connector to an external programming device. The control devices are installed in the motor vehicle during production, programming of the control devices being accomplished at the end of the line or in the shop. The control device contains a microprocessor on which, in an integrated or separate fashion, a nonvolatile programmable memory is provided. The nonvolatile memory is configured, in particular, as a flash EPROM. To program the nonvolatile memory, an authorization signal must be applied to the memory. The programming routine is an internal control device program which makes it possible to program the nonvolatile memory. This programming routine is stored in the ROM or RAM of the control device processor. In order to initiate programming, a signal is transmitted from the external programming device, or tester, to the control device. The control device detects the signal and the programming routine sets the authorization flag. This authorization flag is stored in RAM.

In a first exemplary embodiment, it is assumed that programming of the nonvolatile memory cannot be performed directly from the program memory of the processor in which the programming routine is stored. The programming routine must therefore first be loaded into the executable memory, i.e. from flash memory into X-RAM. For that purpose, the programming routine is broken down into at least two modules, each of which cannot by itself, initiate programming of the nonvolatile memory. After the first module has been loaded, according to the present invention the programming authorization is queried again before the next module is loaded.

In a further example, it is assumed that a specific instruction sequence must be written in order to program the memory. According to the present invention, inquiries which check whether a programming authorization exists are inserted within the programming sequence. If no such authorization exists, programming is terminated. As a result, an unintentional jump to an arbitrary point in the program cannot in any circumstances result in programming of the memory. The programming authorization is initiated by the tester and detected by the processor in the control unit. The program grants the authorization, and sets the authorization flag that is stored in RAM. It is therefore necessary to take additional actions so that this programming authorization is not unintentionally, e.g. due to an execution fault in the program, entered into RAM. This would mean that unintentional programming could be performed despite the intervening check. The following steps are used as additional measures:

1. The programming authorization is stored in multiple redundant fashion in RAM. This prevents authorization from occurring if an authorization flag is unintentionally written to RAM on a single occasion.

2. The programming authorization is not explicitly stored in a program module. Instead, the programming authorization is detected implicitly by way of a check of the contents of specific RAM addresses, the addresses being written from outside, for example by the tester, i.e. not at any point by the program itself.

3. Addresses and/or contents, which are constituents of the programming sequence, are generated only by combining addresses with data transferred from the tester.

FIG. 1 depicts a programming process in an exemplary embodiment. The exemplary embodiment shows the programming operation from bytes 1 through n that are to be programmed by the tester into the nonvolatile memory. The memory is designed so that it programs a byte #i precisely when authorization byte #1, authorization byte #2, address byte #i, and the contents of byte #i are transferred to it correctly and in that sequence. To begin this operation, the tester sends to the control device the request for programming. The tester then sends PF1 through PF3 in program authorization block 8 to the control device, in which they are stored in RAM as authorization flags PF1 through PF3. Byte #i through byte #n in program block 9, which are to be programmed, are then transferred by the tester and temporarily stored in RAM. As defined by the method according to the present invention, in order to program a byte #i, first the authorization is checked. The programming routine checks whether authorization flags PF1 through PF3 1, 2, 3 are correct. If so, authorization byte #1 is transferred to EPROM 4. Then another inquiry 1', 2', 3' for program authorization flags PF1 through PF3 is made. If the check is successful, the second authorization byte #2 is transferred 5. Then the address and contents of byte #i are transferred. This results in the programming of byte #i 7. From this point the programming routine returns back to the starting point in order to transfer the next data of byte #i+1. Each time, the authorization flag is checked first and then the authorization bytes #1 or #2 are written.

What is claimed is:

1. A method for protecting a stored-program control system for a motor vehicle from unintentional overwriting of a nonvolatile programmable memory of a control device, comprising the steps of:

controlling execution of an overwriting operation via a programming routine stored in a memory of the control device;

dividing the programming routine into at least two modules, each of the at least two modules being unable to initiate programming of the nonvolatile programmable memory when executed individually, and each of the at least two modules having an associated programming authorization; and executing each of the at least two modules only after the associated programming authorization is checked.

2. The method according to claim 1, wherein the programming routine includes an instruction sequence, the method further comprising the step of:

performing a programming authorization query and the associated programming authorization after each instruction of the instruction sequence.

3. The method according to claim 1, further comprising the steps of:

storing the associated programming authorization in RAM n times; and programming the nonvolatile programmable memory only after checking the nonvolatile programmable memory for the associated programming authorization n times.

4. The method according to claim 3, wherein n is greater than 1.

5. The method according to claim 1, wherein the associated programming authorization is performed by checking a plurality of specific addresses in RAM.

6. The method according to claim 1, further comprising the step of:

generating the associated programming authorization by at least one of data and a plurality of addresses from an external programming device.

7. The method according to claim 1, further comprising the steps of:

making a programming authorization query to an external programming device; and granting the associated programming authorization from the external programming device after each of the at least two modules of the programming routine is executed.

8. The method according to claim 1, further comprising the step of:

granting the associated programming authorization from an external programming device via an authorization block.

* * * * *

UNITED STATES PATENT AND TRADEMARK OFFICE
CERTIFICATE OF CORRECTION

PATENT NO.    : 6,438,432 B1
DATED         : August 20, 2002
INVENTOR(S)   : Zimmermann et al.

It is certified that error appears in the above-identified patent and that said Letters Patent is hereby corrected as shown below:

<u>Column 2,</u>
Line 11, change "between the" to -- between the programming segments. --

Signed and Sealed this

Fourth Day of November, 2003

JAMES E. ROGAN
*Director of the United States Patent and Trademark Office*